United States Patent
Hasegawa

[11] Patent Number: 6,026,419
[45] Date of Patent: Feb. 15, 2000

[54] SINGLE TONE SIGNAL DETECTOR

[75] Inventor: Atsushi Hasegawa, Tokyo, Japan

[73] Assignee: NEC Corporation, Tokyo, Japan

[21] Appl. No.: 09/031,538

[22] Filed: Feb. 27, 1998

[30] Foreign Application Priority Data

Mar. 6, 1997 [JP] Japan .................................. 9-051900

[51] Int. Cl.[7] .................................................. G06F 17/10
[52] U.S. Cl. ......................................... 708/312; 708/322
[58] Field of Search .................................. 708/312, 319, 708/322

[56] References Cited

U.S. PATENT DOCUMENTS

| | | | |
|---|---|---|---|
| 4,349,889 | 9/1982 | Van Den Elzen et al. ............ | 364/724 |
| 4,531,220 | 7/1985 | Brie et al. .................... | 375/14 |
| 4,571,720 | 2/1986 | Chevreau et al. ................ | 370/32 |
| 4,645,884 | 2/1987 | Barazeche et al. ............... | 379/406 |
| 4,742,510 | 5/1988 | Quatieri, Jr. et al. ........... | 370/32.1 |
| 4,757,527 | 7/1988 | Beniston et al. ................ | 379/410 |
| 4,764,955 | 8/1988 | Galand et al. .................. | 374/411 |
| 4,835,765 | 5/1989 | Bergmans et al. ................ | 370/32.1 |
| 4,862,449 | 8/1989 | Hoefkens et al. ................ | 370/32.1 |
| 4,926,472 | 5/1990 | Batruni et al. ................. | 379/411 |
| 4,935,919 | 6/1990 | Hiraguchi ...................... | 370/32.1 |
| 4,947,361 | 8/1990 | Smith et al. ................... | 708/312 |
| 5,274,579 | 12/1993 | Nelson et al. ................. | 708/312 |
| 5,765,125 | 6/1998 | Daugherty ..................... | 708/312 |
| 5,910,906 | 6/1999 | Schmitt ....................... | 708/312 |

FOREIGN PATENT DOCUMENTS

| | | |
|---|---|---|
| 62-116025 | 5/1987 | Japan . |
| 63-234635 | 9/1988 | Japan . |
| 3-109876 | 5/1991 | Japan . |
| 3-187512 | 8/1991 | Japan . |
| 3-295422 | 12/1991 | Japan . |
| 4-15525 | 1/1992 | Japan . |
| 4-15526 | 1/1992 | Japan . |
| 4-92540 | 3/1992 | Japan . |
| 4-128895 | 4/1992 | Japan . |
| 4-223708 | 8/1992 | Japan . |
| 6-35482 | 2/1994 | Japan . |
| 6-139139 | 5/1994 | Japan . |
| 6-250676 | 9/1994 | Japan . |
| 6-332468 | 12/1994 | Japan . |
| 6-332477 | 12/1994 | Japan . |
| 7-336250 | 12/1995 | Japan . |

*Primary Examiner*—David H. Malzahn
*Attorney, Agent, or Firm*—Young & Thompson

[57] ABSTRACT

A signal detector for detecting a narrow-band signal of a desired frequency, using an adaptive type FIR filter having two filter coefficients, is disclosed. Using this filter, the input signal of a shift register which delays the signal, is estimated by referring to the output therefrom. A narrow-band signal of a desired frequency is detected by comparing each filter coefficient of this filter with a known filter coefficient corresponding to the frequency which is the object of detection.

8 Claims, 4 Drawing Sheets

SINGLE TONE SIGNAL DETECTOR

BACKGROUND OF THE INVENTION

1. Field of the Invention

The present invention relates to a signal detector to detect a single tone of a single frequency sinusoidal wave inclusive of a phase change.

2. Description of the Related Art

FIG. 1 shows a block diagram of a narrow-band signal detector disclosed in Japanese Patent Application Laid-Open No. 295422/91.

Digital signal x(t) is input to unit delay circuit 401 and subtracter 403 from input terminal 413. Unit delay circuit 401 delays input digital signal x(t) by one sample time, and outputs the delayed input digital signal to unit delay circuit 402 and multiplier 404. Multiplier 404 multiplies the output of unit delay circuit 401 by output $a_1$ of filter coefficient modification unit 407. Meanwhile, the output of unit delay circuit 402 is input to multiplier 405, and is multiplied by output $a_2$ of filter coefficient modification unit 408.

Next, the outputs of multipliers 404 and 405 are summed up by adder 406 and the resultant signal is input to subtracter 403 as an estimation signal. Subtracter 403 subtracts the estimation signal from input digital signal x(t), with the output being accepted as a residual difference signal. The outputs of both filter coefficient modification units 407 and 408 are modified adaptively based on the residual difference signal.

Signal-to-noise (hereinafter referred to as S/N) ratio calculator 409 calculates a signal power ratio between the audio part and audio-free part of input digital signal x(t). Then, threshold selector 410 selects a threshold corresponding to the output of S/N ratio calculator 409 from a plurality thresholds of, and outputs it. Judgment unit 411 compares filter adaptive coefficient $a_2$, which is an output of filter coefficient modification unit 408, with a variable threshold approximate to −1 corresponding to the S/N ratio, which is the output of threshold selector 410, to judge whether or not the input digital signal is a single tone. When filter adaptive coefficient $a_2$ is below the threshold, judgment unit 41 determines that the input is a single tone, and outputs a single tone detection signal from output terminal 412.

In the narrow-band signal detector shown in FIG. 1, an input signal is estimated, based on past input signals, using an adaptive filter. If filter coefficient $a_2$ have converged to 1, input signal x(t) is determined as a narrow-band signal. Further, when the calculated S/N of the input signal is low, the threshold to be applied for judgment is changed. Thus detection of a narrow-band signal is possible even when the S/N ratio is low.

FIG. 2 shows a block diagram of a detector to detect a narrow-band signal of a desired frequency inclusive a phase change. The detector has a required number of band pass filters corresponding to desired frequencies and judgment units.

Input signal x(t) from input terminal 531, is input to each of the band pass filters 501~50n. Judgment units 511~51n compare each input signal of each of the band pass filters 501~50n with the output signal therefrom. If the result of the comparison shows a small difference, a judgment is made that there has been an input of the in-band frequency signal of the band pass filter concerned.

In detecting a phase change, the point where a level-compared value changes is noted. Since the instant some phase deviation takes place, input signal x(t) becomes an out-band frequency signal, a level difference occurs between each input and output of band pass filters 501~50n. Phase deviation data is detected at this instant. Detection circuit 520 detects from the outputs of respective judgment units 511~51n that there has been an input of the signal of a desired frequency and subsequently outputs the result to output terminal 532.

The large concerns in realizing a signal detector involve the amount of arithmetic operation and the accuracy of detecting low S/N signals.

Example 1 of the prior art (FIG. 1) shows the following problems:

Firstly, as the prior art aims to detect a narrow-band signal, it can not specify the frequency of a narrow-band signal.

Secondly, due to lack of a function to control the amount of modification serviceable for filter coefficient alteration, the filter coefficient modification amount converges unstably with low S/N signals. This makes it necessary to monitor the S/N ratio and then change a judgment threshold when the S/N ratio is found to be low. As a result, accuracy of detection is lowered.

Example 2 of the prior art (FIG. 2) shows the following problems:

Firstly, in a case where a plurality of frequencies are the objects of detection, a plurality of band pass filters must be provided. Each filter must inputs processes every sampled and data, thus resulting in the increase of the amount of overall arithmetic operation within a unit time.

Secondly, a judgment by means of a level comparison between the input to and the output from a band pass filter, causes an error when the input signal is of a low S/N. As a result, detection becomes difficult with low S/N input signals.

Thirdly, as regards detection of phase change, though a phase change point is detectable, the amount of a change in phase is not detectable.

SUMMARY OF THE INVENTION

It is an object of the present invention to provide a signal detector to detect narrow-band signals of a plurality of desired frequencies, which requires little arithmetic operation, exhibits high accuracy of detection, and is capable of detecting both the point and amount of a phase changing.

The signal detector according to the present invention incorporates an adaptive type F.I.R (finite impulse response) filter having two filter coefficients so as to allow variability of a modification range applied to modify respective filter coefficients. Using this filter, the input signal to a shift register which delays it is estimated by referring to the output signal. Namely, by comparing respective filter coefficients of the filters with a known filter coefficient corresponding to the frequency which is the object of detection, a narrow-band signal of a desired frequency can be detected as an equivalent to the input signal.

A comparison of the filter coefficients of FIR filter with a plurality of data enables detecting a plurality of narrow-band signals through a single filter processing.

In addition, controlling the amount of modification referred to above based on detecting conditions makes it possible to stably calculate a filter coefficient for even low S/N input signals. As a consequence, stabilized accuracy of detection is expected.

Besides, with the amount of filter coefficient modification increased while emphasis is placed on the estimation converging rate at the stage of failure in detecting a narrow-band signal, but with respective filter coefficients sets small after the detection thereof, it is expected to substantially shorten the time of detection.

Further, delaying the shift of a shift register allows the detection of a point and an amount of phase change of an input narrow-band signal.

The above and other objects, features and advantages of the present invention will become apparent from the following description with reference to the accompanying drawings which illustrate examples of the present invention.

DESCRIPTION OF PREFERRED EMBODIMENTS

Figure 1:
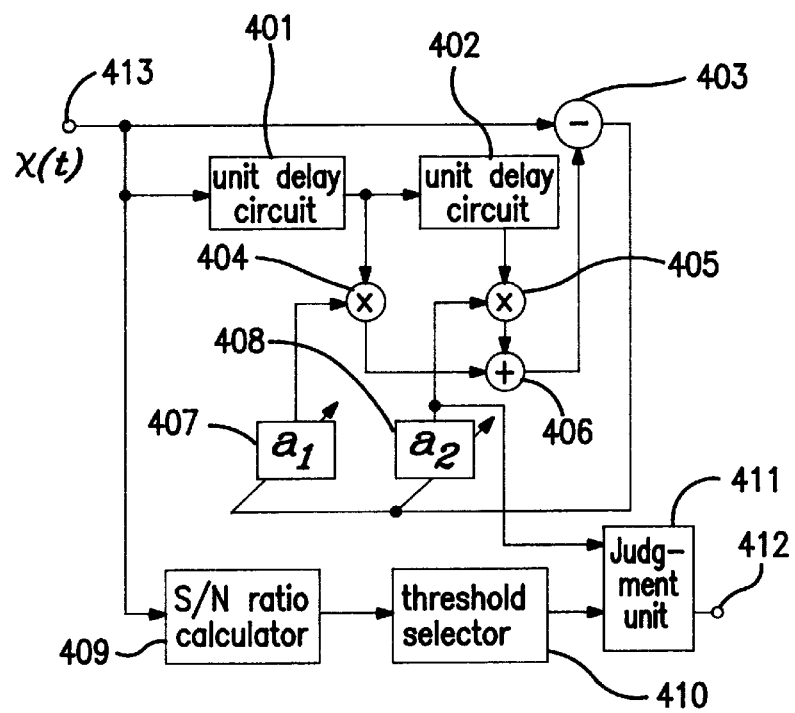
FIG. 1 is a block diagram illustrating a first example of the prior art.
Figure 2:
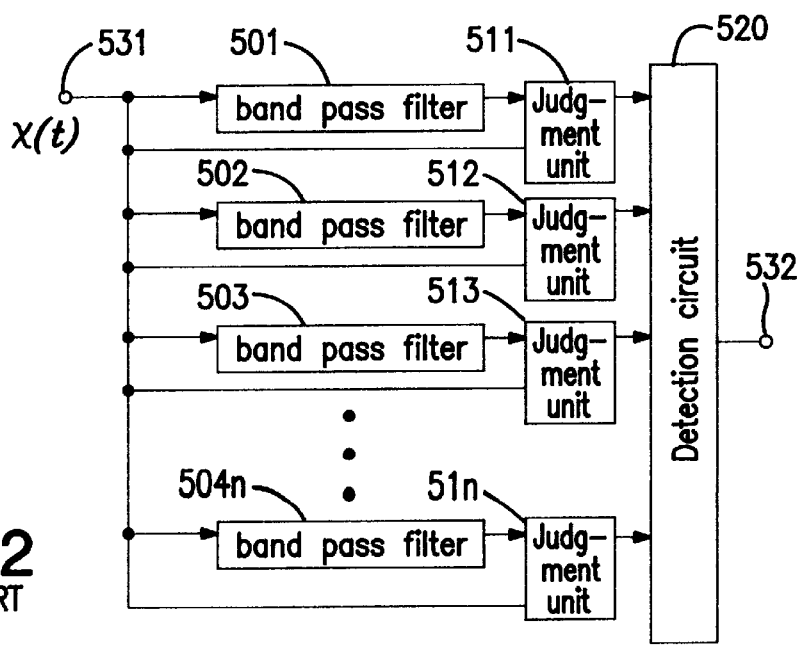
FIG. 2 is a block diagram illustrating a second example of the prior art.
Figure 3:
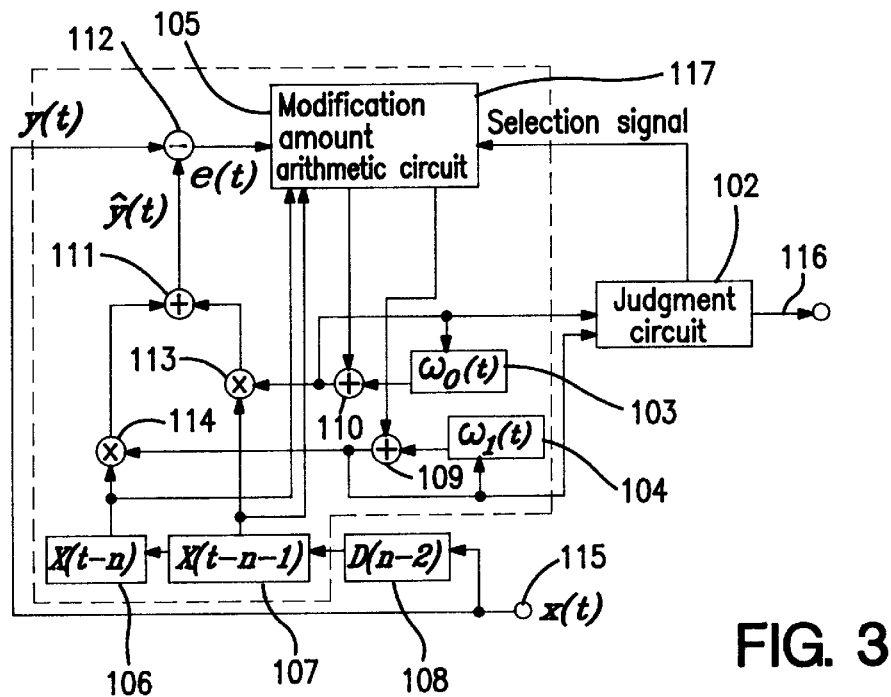
FIG. 3 is a block diagram illustrating a signal detector of the first embodiment according to the present invention.

A signal detector of the first embodiment according to the present invention is illustrated referring to FIG. 3. The signal detector of this embodiment comprise shift register 108 which delays input signal x(t) from input terminal 115 by (n−2) samples, 2-tap adaptive type FIR filter 117 (employing a learning type identification method in this embodiment) to estimate input signal x(t) to shift register 108 by referring to the output thereof, and judgment circuit 102 to monitor, in reference to the filter coefficient corresponding to a desired frequency, the values in filter coefficient memories 103, 104 of adaptive type FIR filter 117.

Adaptive type FIR filter 117 comprises delay elements 107, 108 for delaying the outputs of shift register 108, and outputting reference signals x(t−n), x(t−n−1), respectively, filter coefficient memories 103, 104 for storing filter coefficients $w_0(t)$, $w_1(t)$, adders 110, 109 for adding respective amounts of modification $C_0$, $C_1$ to filter coefficient $w_0(t)$, $w_1(t)$, multiplier 114 for multiplying the output (reference signal x(t−n)) of delay element 106 by the output of adder 109, multiplier 113 for multiplying the output (reference signal x(t−n−1)) of delay element 107 by the output of adder 110, adder 111 for summing up the outputs of multipliers 113, 114, subtracter 112 for obtaining the difference between input signal y(t) (=x(t)) and the output of adder 111, to provide residual difference signal e(t) and modification amount arithmetic circuit 105 for calculating modification amounts $C_0$, $C_1$ of respective filter coefficients, based on reference signals x(t−n), x(t−n−1) and the output of subtracter 112.

Figure 4:
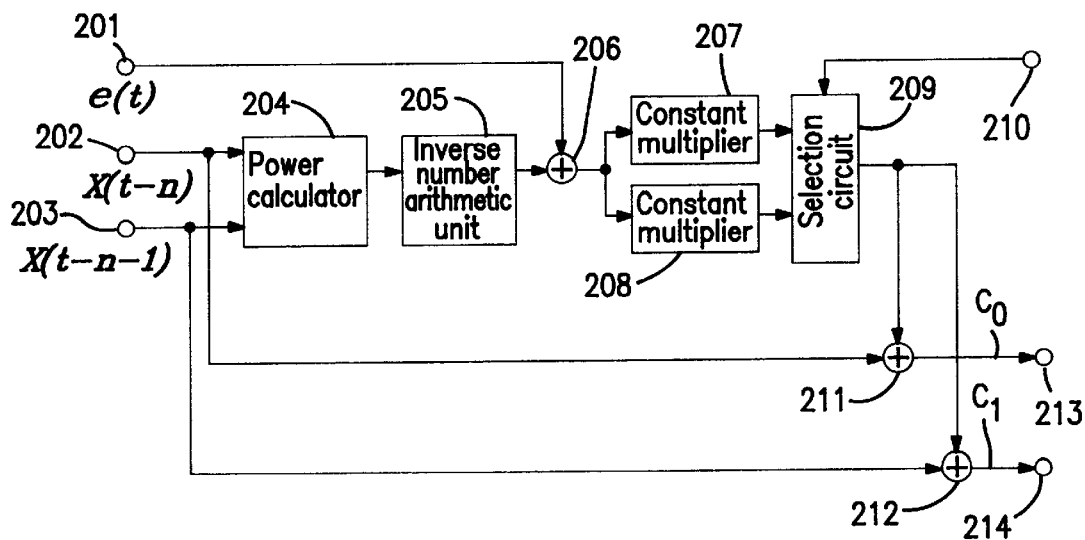
FIG. 4 is a block diagram illustrating modification amount arithmetic circuit 105 shown in FIG. 3.

FIG. 4 shows a block diagram illustrating modification amount arithmetic circuit 105. Modification amount arithmetic circuit 105 comprises power calculator circuit 204 for calculating the power of each respective reference signal x(t−n), x(t−n−1) which are input respectively from reference signal input terminals 202, 203, inverse number arithmetic unit 205 for inverse number arithmetic operation for the output from power calculator circuit 204, multiplier 206 for multiplying residual difference signal e(t) input from residual difference input terminal 201 by the output of inverse number arithmetic unit 205, constant multipliers 207, 208 for multiplying the output of multiplier 206 by respective constants $\mu 0$, $\mu 1$, selector circuit 209 for selecting one of the outputs from constant multipliers 207, 208 based on a judgment result signal from judgment result input terminal 210, multiplier 211 for multiplying reference signal x(t−n) by the output of selector circuit 209 and outputting filter coefficient modification amount $C_0$ to modification amount output terminal 213, and multiplier 212 for multiplying reference signal x(t−n−1) by the output of selector circuit 209, and outputting a filter coefficient modification amount to modification amount output terminal 214.

Figure 5:
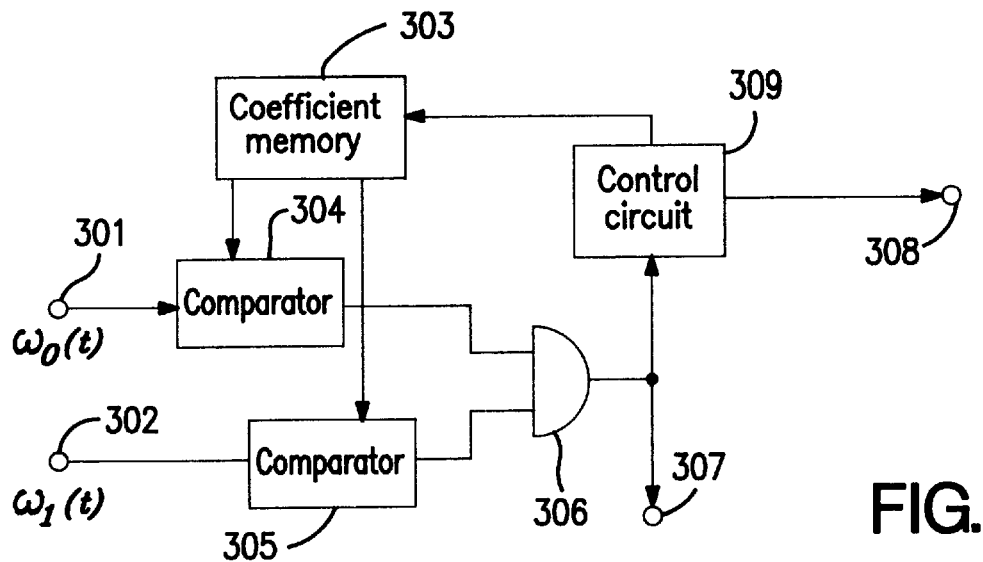
FIG. 5 is a block diagram illustrating judgment circuit 102 shown in FIG. 3.

FIG. 5 is a block diagram of judgment circuit 102. Judgment circuit 102 comprises coefficient memory 303 for storing a filter coefficient corresponding to a desired frequency, comparators 304, 305, for comparing each of filter coefficients $w_0(t)$, $w_1(t)$ input respectively from filter coefficient input terminals 301, 302 with the output value of coefficient memory 303, and each outputting a signal "1" when the filter coefficient is within a certain range, centering around an output value of coefficient memory 303, AND circuit 306 for performing an AND operation of the outputs from comparators 304, 305, and generating a selection signal to output the signal to selection signal output terminal 307 and control circuit 309 for outputting the address of coefficient memory 303 to coefficient memory 303 and outputting a signal of the frequency corresponding to the address to detection result output terminal 308 when the output of AND circuit 306 is "1".

Next, adaptive type FIR filter 177 will be described.

As regards 2-tap adaptive type FIR filter, estimated signal ŷ which is an output of adder 111 at the time t is calculated with the following expression (1). The arithmetic operation involved is carried out by multipliers 113, 114 and adder 111.

$$\hat{y}(t) = \sum_{i=0}^{1} Wi(t) \times (t - i - n - 1) \quad (1)$$

where $w_i(t)$ denotes i-th filter coefficient at the time of t, and x(t) stands for a reference signal at the time of t. As shown illustrated in expression (2), estimated signal ŷ(t) given in expression (1) is subtracted from signal y(t) at the time of t which is the object of detection. This arithmetic operation is effected by subtracter 112.

$$e(t) = \hat{y}(t) - y(t) \quad (2)$$

With the learning type identification method illustrated in this embodiment, filter coefficient $w_i(t)$ (i=0,1) is renewed according to expression (3) so that residual difference signal e(t) given in expression (2) may be minimized. This arithmetic operation is effected by adders 109, 110 and modification amount arithmetic circuit 105.

$$W_i(t+1) = w_i(t) + \mu(t)e(t) \times (t-i-n-1) \quad (3)$$

where step size $\mu(t)$ at the time of t is given by expression (4).

This arithmetic operation is effected by the circuit in FIG. 4.

$$\mu(t)=\mu 0/P_x(t) \quad (4)$$

where $\mu 0$ is a modification constant, by which the stability of estimation is determined.

The larger $\mu 0$ is, the more faster estimation converges, while the lesser $\mu 0$ is, the more slower estimation, nevertheless, stable estimation becomes possible even with low S/N input signals. As illustrated in FIG. 4, controlling $\mu 0$, with a $\mu 0$-value selector circuit provided, according to the convergence conditions enables the signal detector to not only cut short the time of estimation but also make stable estimation even with low S/N input signals.

In the event of failure in signal detection, for example, convergence of estimation is promoted by selecting a large value (for the output of constant multiplier 207). If filter coefficients $w_0(t)$ and $w_1(t)$ are determined by comparators 304, 305 in judgment circuit 102 shown in FIG. 5 as being the values approximate to the filter coefficient corresponding to a desired frequency, a small value is chosen (for the output of constant circuit 208) so as to promote stable estimation.

It is noted here that $P_x(t)$ represents the power of the reference signal which the learning type identification method characterizes and is given by expression (5). This arithmetic operation is effected by power calculator circuit 204 in FIG. 4. By this arithmetic operation, normalization is implemented in expression (4), thereby enhancing the expectation for compensating the accuracy of calculations and the convergence rate of estimation, whether the magnitude of an input signal is large or small.

$$P_x(t) = \sum_{i=0}^{1} x^2(t - i - n - 1) \quad (5)$$

The processing in the adaptive type FIR filter is carried out according to expressions (1) through (5) (reference: Noda/Nagumo's "System's Learning Type Identification Method" Scheme & Control 7,9; page 5 (1989).

The reason why the frequency information of a narrow-band signal can be identified by adaptive type FIR filter having two coefficients $w_0(t)$ and $w_1(t)$ in this embodiment will be explained below.

It is now assumed that input signal x(t) is given by expression (6), where A denotes a frequency dependent constant, and t time. If the presentation of expression (7) is introduced, the values of $\alpha$ and $\beta$ are decided straight.

$$x(t)=\sin(At) \quad (6)$$

$$x(t)=\alpha \cdot \sin\{A(t-n)\}+\beta \cdot \sin\{A(t-n-1)\} \quad (7)$$

$$\alpha=\sin\{A(n+1)\}/\sin A \quad (8)$$

$$\beta=\sin(An)/\sin A \quad (9)$$

If expression (6) is substituted in expression (7), and $\alpha$ and $\beta$ are replaced respectively by $w_0(t)$ and $w_1(t)$, then expression (7) becomes equivalent to adaptive type FIR filter 117 shown in FIG. 3. If x(t)=y(t), expression (7) is expressed below.

$$y(t)=w_0(t) \cdot x(t-n-1)+w_1(t) \cdot x(t-n) \quad (10)$$

From the above, it can be considered that filter coefficients $w_0(t)$, $w_1(t)$ of 2-tap adaptive type FIR filter given in expression (10) will converge to the respective values of $\alpha$ and $\beta$ which satisfy expressions (8) and (9). Since coefficient A is a frequency dependent constant, filter coefficients $w_0(t)$, $w_1(t)$ are monitored and are compared with the values of $\alpha$ and $\beta$ respectively which have previously been obtained to determine whether or not input signal x(t) is of the frequency that is the object of detection.

Figure 6:
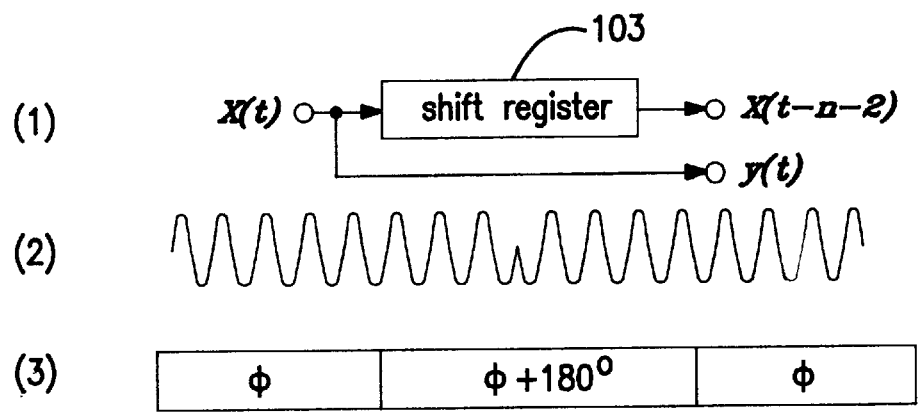
FIG. 6 is an illustrative diagram showing a phase deviation of an input signal.

As shown in FIG. 6, while a phase change point of input signal x(t) passes through shift register 108, the n-value in expression (7) changes correspondingly to the amount of a phase deviation. In a case where the phase deviation is as much as 180 deg., for example, the phase difference between input signal y(t) of shift register 108 and output signal x(t-n-2) varies by 180 deg. from the original phase difference while the phase change point of the input signal passes through shift register 108.

The respective values of $\alpha$ and $\beta$ corresponding to the plural frequencies which are the objects of detection are calculated in advance, and are stored in coefficient memory 303 in FIG. 5 as the data of comparison. Control circuit 309 selects the data of a desired frequency and then causes each of comparators 304, 305 to compare it with each of filter coefficients $w_0(t)$, $w_1(t)$. If the result of each comparison is found within a range of comparison, each respective comparators 304, 305 output a signal "1", and therefore the output of AND circuit 306 becomes "1", whereby control circuit 309 determines that a narrow-band signal of the currently selected frequency has been input. Further, control circuit 309 stores in coefficient memory 303 the value of a filter coefficient corresponding to the amount of phase deviation in the currently selected frequency as known data, and thus it can detect the amount of a phase change from the change in filter coefficient which occurs when the phase changes.

As features of this embodiment, (1) practicability of detecting narrow-band signals of a plurality of frequencies by use of one filter, (2) stable accuracy of detecting low S/N input signals, and (3) feasibility of detecting a phase deviation point and a phase deviation angle can be enumerated.

Control circuit 309 shown in FIG. 5 controls the respective functions. Control circuit 309 outputs the address information, at which necessary data are written, to coefficient memory 303 so that comparators 304, 305 may be fed with the values corresponding to the frequencies which are the objects of detection. Further, control circuit 309 determines whether or not the signal of the frequency which is currently the object of detection has been input by referring to the information obtained form each output of comparators 304, 305.

As regards the feature of (1), typical processing particulars are exemplified below:

In the case of detecting three different signals of frequencies a, b and c, control circuit 309 performs the following steps:

(1) A step of outputting to coefficient memory 303 the information of the address into which the filter coefficient corresponding to frequency a is written;

(2) A step of determining whether or not the results of the comparisons, which comparators 304, 305 have, using the information of currently designated frequency a, are identical with reference to the output of AND circuit 306;

(3) A step of advancing to (4) when results are identical, or to (5) when otherwise;

(4) A step, wherein input signal x(t) is determined as being a narrow-band signal having frequency a, with the address information remaining unchanged, and the information of the fact that the narrow-band signal of frequency a has been detected is then output to detection result terminal 308, is followed by returning to (3);

(5) A step, wherein the information of an address, into which the filter coefficient corresponding to frequency b is written, is output to coefficient memory 303;

(6) A step of advancing to (7) when the findings of comparators 304, 305 are identical, or to (8) when otherwise;

(7) A step, wherein input signal x(t) is determined as being a narrow-band signal having frequency b, with the address information remaining unchanged, and the information of the fact that the narrow-band signal of frequency b has been detected is then output to detection result output terminal 308, followed by returning to (6);

(8) A step, wherein the information of an address, into which the filter coefficient corresponding to frequency c is written, is output to coefficient memory 303;

(9) A step of advancing to (10) when the results of comparators 304, 305 are identical or returning to (1) when otherwise; and

(10) A step, wherein input signal x(t) is determined as being a narrow-band signal having frequency c, with the address information remaining unchanged, and the information of the fact that the narrow-band signal of frequency c has been detected is then output to detection result output terminal 308, followed by a return to (9).

As described in the foregoing, the results of those comparisons by comparators 304, 305 are monitored according to the sequence of each respective frequency a, b or c. This processing does not require to effect sampling every one of the input signals, unlike the filter processing, but allows dispersed sampling, thus resulting in expectation of cutting the amount of actual arithmetic operation.

As regards the feature of (2), in the above-quoted typical processing particulars, when the conditional particulars referred to in (4), (7) and (10) occur, namely, when a signal having one of above-specified frequencies is detected, judgment circuit 102 changes the selection signal for modification amount arithmetic circuit 105. Due to this control, a modification constant of modification amount arithmetic circuit 105 is selected to be of a small value suited for stable filter coefficient convergence.

Due to this processing, a stable state of convergence can be maintained even with low S/N input signals, whereby it can be expected that the accuracy of signal detection will be improved.

Further, in respect of the feature of (3), the presentation of typical processing particulars in the foregoing is premised on the conditional particularities referred to in (4) being existent and stable.

(11) A step of advancing to (11) when the results of comparators 304, 305 are identical, or to (12) when otherwise;

(12) A step, wherein if respective results are not identical, the address information, into which the filter coefficient corresponding to the amount of a phase deviation conforming to frequency a is written, is output to coefficient memory 303, and further wherein a monitoring timer counts up to its setting, and if the timer is not through with counting up to the setting, there is an advance to (13) but if the timer has its counting completed, the advance is to (14);

(13) A step of advancing to (14) when the respective results are not identical, or to (16) when otherwise;

(14) A step, wherein the information of an address, into which the filter coefficient corresponding to the amount of a subsequent phase change conforming to frequency d is written, is output to coefficient memory 303, and further wherein the monitoring timer counts up to its setting, and if the timer is not through with counting up to the setting, there is an advance to (13) but if the counting completed, the advance is to (15);

(15) A step of determining that no signal of a phase deviation has been input, and returning to (1);

(16) A step, wherein input signal x(t) is assumed to contain a point of a phase deviation equal to the currently designated phase deviation amount corresponding to frequency a, with the address information remaining unchanged, and further wherein the monitoring timer counts up to its setting, and if the timer is not through with counting up to the setting, there is an advance to (17), or otherwise, there is a return to (15);

(17) A step of returning to (16) when the respective results are identical or storing the phase change amount selected in (16) into the memory if the results are not identical, and advancing to (18);

(18) A step, wherein the address information, into which the filter coefficient corresponding to frequency a is written, is output to coefficient memory 303;

(19) A step of advancing to (20) when the respective results are identical, or otherwise, returning to (15); and

(20) A step, wherein the information of a phase deviation stored in the memory in (17) is output.

According to a series of these judgment-included steps, it is possible to detect a narrow-band input signal and both a phase change point and the amount of a phase deviation which input signal x(t) contains.

Figure 7:
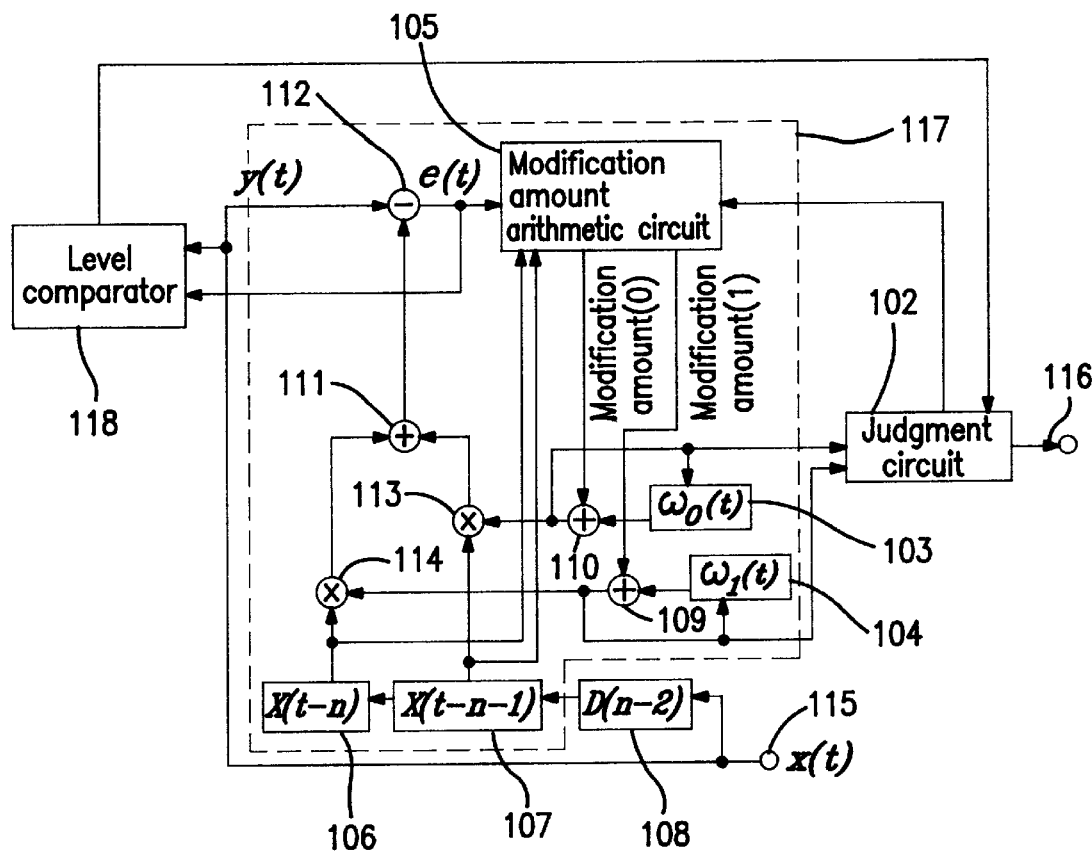
FIG. 7 is a block diagram illustrating a signal detector of the second embodiment according to the present invention.

FIG. 7 is a block diagram illustrating a signal detector of the second embodiment according to the present invention. This embodiment features that the detection of a phase change point is achieved in a method different from that of the first embodiment. Specifically, level comparator 118 compares the level of input signal y(t) of subtracter 112 with the level of output signal e(t) of the same. For narrow-band input signals, a signal estimation is effected, using adaptive type FIR filter 117, as illustrated by expression (9) and the level difference between the input and output signal to and from subtracter 112 is found to be of a positive value when calculated according to expression (10).

Level difference $$=\text{level } y(t) - \text{level } e(t) \qquad (10)$$

Figure 8:
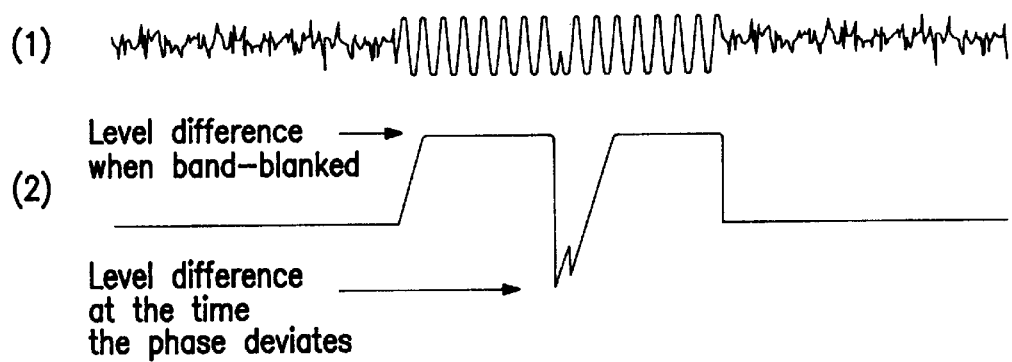
FIG. 8 is an operation illustrative diagram of the first embodiment.

FIG. 8 is a graphic presentation using a definite example quoted to illustrate how the level difference is obtained. Enumerated are input signal example (FIG. 8a), which is (1) a non-narrow-band input signal, (2) a narrow-band input signal, (3) a phase change point (180 deg.), (4) a narrow-band signal and (5) a non-narrow-band signal. In this case, the level difference varies as shown in FIG. 8b. With such non-narrow band input signals as (1) an d (5), adaptive type FIR filter 117 fails to make a signal estimation, allowing no observation of a level difference. However, when a narrow-band signal of (2) is input, and the signal estimation is conducted, it can be found, by the respective processings referred to in expressions (1) through (5), the value of residual difference signal e(t) given in expression (2) is approximating to 0 and the level difference becomes positively large. And at the time the phase change is as much as 180 deg. as in example (3), output e(t) of subtracter 112 is double input signal y(t). This is because a phase inversion takes place, with subtraction, thus far normally implemented, being changed to addition. The result is that the level difference becomes negative. Detecting the timing at which the phase difference becomes negative makes it possible to detect the point of phase change. Further, since the magnitude (negative) of the level difference at a phase change point depends on the amount of a phase change, detecting the phase change amount is likewise allowed. Judgment circuit 102 not only detects the narrow-band signals but also monitors the output of level comparator 118, thereby allowing the detection of narrow-band input signals including a phase change point.

This embodiment encounters difficulty to improve the accuracy of detecting the phase change amount but is advantageous in that the processings involved can be simplified because there is no need to store the filter coefficients corresponding to respective phase change amounts for a comparison.

While the preferred embodiments of the present have been described, using specific terms, each description is for illustrative purposes only, and it is to be understood that changes and variations may be made without departing from the spirit or scope of the following claims.

What is claimed is:

1. A signal detector for detecting whether or not the input signal is a narrow band signal of a desired frequency, comprising:

a shift register for delaying the input signal;

an adaptive type FIR filter having two filter coefficients for estimating the input signal of said shift register by referring to the output thereof; and judgment means for monitoring said two filter coefficients of said adaptive type FIR filter, judging, from the respective monitored values, whether or not said input signal is a desired narrow-band signal and further detecting the point and the amount of a phase change contained in said narrow-band signal.

2. The signal detector according to claim 1, further comprising a level comparator for obtaining a level-compared value which is a level difference between the level of an input signal to said adaptive type FIR filter and a difference signal between the input signal to said adaptive type FIR filter and an estimation signal generated in said adaptive type FIR filter, and wherein said judgment means includes means for detecting a narrow-band input signal inclusive of a phase change point by monitoring the level-compared value output from said level comparator.

3. The signal detector according to claim 1, wherein said judgement means comprises a coefficient memory for storing the filter coefficient corresponding to a desired frequency that is the object of detection; two comparators for comparing the value of an output from said coefficient memory with each of two filter coefficients of said adaptive type FIR filter and then outputting an active signal when said filter coefficients are found to be within a range centering around the value of said output; a gate circuit for outputting an active selection signal when the respective outputs of said two comparators are active; and a control circuit for outputting address information for desired data to said coefficient memory and subsequently outputting a signal of the frequency corresponding to said address as a result of detection when said AND circuit outputs an active selection signal.

4. The signal detector according to claim 3, further comprising a level comparator for obtaining a level-compared value which is a level difference between the level of an input signal to said adaptive type FIR filter and a difference signal between the input signal to said adaptive type FIR filter and an estimation signal generated in said adaptive type FIR filter, and wherein said judgment means includes means for detecting a narrow-band input signal inclusive of a phase change point by monitoring the level-compared value output from said level comparator.

5. The signal detector according to claim 3, wherein said adaptive type FIR filter comprises a first delay element for delaying the output of said shift register and then outputting a first reference signal; a second delay element for delaying the output of said first delay element and then outputting a second reference signal; first and second coefficient memories having first and second filter coefficients stored therein respectively; first and second adders for adding a first and a second modification amount to the first and second filter coefficient outputs from the respective first and second filter coefficient memories; a first and a second multiplier for multiplying the first and second reference signal by the outputs of the first and second adder respectively; a third adder for summing up the outputs of the first and second multiplier; a subtracter for subtracting said input signal from the output of the third adder to output a residual difference signal; and a modification amount arithmetic circuit for inputting said first and a second reference signal, said residual signal and a selection signal output from said judgment circuit, and for calculating and outputting first and a second modification amount from the first and second reference signal respectively so that said residual difference signal may be minimized.

6. The signal detector according to claim 5, further comprising a level comparator for obtaining a level-compared value which is a level difference between the level of an input signal to said adaptive type FIR filter and a difference signal between the input signal to said adaptive type FIR filter and an estimation signal generated in said adaptive type FIR filter, and wherein said judgment means includes means for detecting a narrow-band input signal inclusive of a phase change point by monitoring the level-compared value output from said level comparator.

7. The signal detector according to claim 5, wherein said modification amount arithmetic circuit comprises a power calculator circuit for calculating the powers of said first and second reference signals; an inverse number arithmetic unit for inverse number arithmetic operation of the output from said power calculator circuit; a multiplier for multiplying said residual difference signal by the output of said inverse number arithmetic unit; a first and a second constant multiplier for multiplying the output of said multiplier by a first constant and a second constant, respectively, which is smaller than the first constant; a selector circuit for selecting the output of the first constant multiplier when said selection signal is inactive and selecting the output of the second constant multiplier when said selection signal is active; and a first and a second multiplier for multiplying respective first and second reference signals by the output of said selector circuit and then outputting the results of multiplication as respective first and second modification amounts.

8. The signal detector according to claim 7, further comprising a level comparator for obtaining a level-compared value which is a level difference between the level of an input signal to said adaptive type FIR filter and a difference signal between the input signal to said adaptive type FIR filter and an estimation signal generated in said adaptive type FIR filter, and wherein said judgment means includes means for detecting a narrow-band input signal inclusive of a phase change point by monitoring the level-compared value output from said level comparator.

* * * * *